US012767492B2

(12) United States Patent
Al-Husseini et al.

(10) Patent No.: US 12,767,492 B2
(45) Date of Patent: Oct. 20, 2026

(54) DEVICE FOR STABILIZING A HOISTED OBJECT

(71) Applicant: Vita Inclinata IP Holdings LLC, Broomfield, CO (US)

(72) Inventors: Mahdi Al-Husseini, Waialua, HI (US); Joshua Lamar Barnett, Douglasville, GA (US); Anthony Chen, Stanford, CA (US)

(73) Assignee: Vita Inclinata IP Holdings LLC, Denver, CO (US)

( * ) Notice: Subject to any disclaimer, the term of this patent is extended or adjusted under 35 U.S.C. 154(b) by 979 days.

(21) Appl. No.: 18/082,228

(22) Filed: Dec. 15, 2022

(65) Prior Publication Data

US 2023/0117935 A1 Apr. 20, 2023

Related U.S. Application Data

(63) Continuation of application No. 16/360,075, filed on Mar. 21, 2019, now Pat. No. 11,535,496.

(60) Provisional application No. 62/677,177, filed on May 28, 2018.

(51) Int. Cl.
*B66C 13/06* (2006.01)

(52) U.S. Cl.
CPC ............ *B66C 13/063* (2013.01); *B66C 13/06* (2013.01); *F16C 2361/55* (2013.01); *F16C 2380/28* (2013.01)

(58) Field of Classification Search
CPC ... B66C 13/063; B66C 13/06; F16C 2361/55; F16C 2380/28
See application file for complete search history.

(56) References Cited

U.S. PATENT DOCUMENTS

| | | | |
|---|---|---|---|
| 1,935,283 | A | 11/1933 | Adams |
| 2,264,936 | A | 12/1941 | Dorsa |
| 2,428,656 | A | 10/1947 | Elliott et al. |
| 2,651,533 | A | 9/1953 | Cecil |
| 2,717,856 | A | 9/1955 | Bannister |
| 3,036,797 | A | 5/1962 | Domenico |
| 3,044,818 | A | 7/1962 | Harry |
| 3,210,115 | A | 10/1965 | Irving et al. |
| 3,265,336 | A | 8/1966 | Peterson |

(Continued)

FOREIGN PATENT DOCUMENTS

| | | | |
|---|---|---|---|
| EP | 0606108 | A1 | 7/1994 |
| GB | 2327667 | A | 2/1999 |

(Continued)

OTHER PUBLICATIONS

All pages, Written Opinion dated Apr. 30, 2020 for PCT Application No. PCT/US2020/017790, filed Feb. 11, 2020.

(Continued)

*Primary Examiner* — Justin Holmes
(74) *Attorney, Agent, or Firm* — Martin Spencer Garthwaite

(57) ABSTRACT

Disclosed are various embodiments for stabilizing a hoisted object. A hoisted object such as a litter can have a tendency spin while being retrieved on a lift line. A device may be connected to the hoisted object to reduce a spin or other angular velocity of the hoisted object. The device may monitor stability of the hoisted object and determine that the hoisted object is unstable. The device may be configured to rotate at least one flywheel to apply torque to an enclosure of the device.

20 Claims, 3 Drawing Sheets

(56) References Cited

U.S. PATENT DOCUMENTS

| | | | |
|---|---|---|---|
| 3,498,476 | A | 3/1970 | Mattson et al. |
| 3,554,468 | A | 1/1971 | Mcvicar |
| 3,598,440 | A | 8/1971 | Ramsden et al. |
| 3,601,342 | A | 8/1971 | Piasecki |
| 3,602,544 | A | 8/1971 | Marsh |
| 3,656,796 | A | 4/1972 | Cook |
| 3,690,602 | A | 9/1972 | Marsh |
| 3,724,817 | A | 4/1973 | Simons |
| 3,829,052 | A | 8/1974 | Flannelly |
| 3,833,189 | A | 9/1974 | Fowler et al. |
| 3,838,836 | A | 10/1974 | Asseo et al. |
| 3,904,156 | A | 9/1975 | Smith |
| 3,946,971 | A | 3/1976 | Chadwick |
| 4,124,181 | A | 11/1978 | Kolwey |
| 4,138,078 | A | 2/1979 | Hester et al. |
| 4,267,987 | A | 5/1981 | McDonnell |
| 4,364,704 | A | 12/1982 | Dreesen et al. |
| 4,378,919 | A | 4/1983 | Smith |
| 4,553,719 | A | 11/1985 | Ott |
| 4,601,444 | A | 7/1986 | Lindenbaum |
| 4,695,012 | A | 9/1987 | Lindenbaum |
| 4,747,745 | A | 5/1988 | Pippen et al. |
| 4,826,109 | A | 5/1989 | Camus |
| 4,881,601 | A | 11/1989 | Smith |
| 4,883,184 | A | 11/1989 | Albus |
| 4,889,297 | A | 12/1989 | Ikeda |
| 4,984,757 | A | 1/1991 | Hartung et al. |
| 5,071,184 | A | 12/1991 | Dessaux |
| 5,071,573 | A | 12/1991 | Coffindaffer et al. |
| 5,125,707 | A | 6/1992 | Chaen et al. |
| 5,131,491 | A | 7/1992 | Varner et al. |
| 5,143,326 | A | 9/1992 | Parks |
| 5,190,250 | A | 3/1993 | DeLong et al. |
| 5,249,652 | A | 10/1993 | Leitzman et al. |
| 5,273,333 | A | 12/1993 | Hatfield et al. |
| 5,299,845 | A | 4/1994 | Gabriel |
| 5,344,203 | A | 9/1994 | Tollenaere |
| 5,352,056 | A | 10/1994 | Chandler |
| 5,358,219 | A | 10/1994 | Shenk et al. |
| 5,396,815 | A | 3/1995 | Polites et al. |
| 5,443,566 | A | 8/1995 | Rushmer et al. |
| 5,451,032 | A | 9/1995 | Rhoads |
| 5,465,925 | A | 11/1995 | Connolly et al. |
| 5,499,785 | A | 3/1996 | Roberts et al. |
| 5,518,205 | A | 5/1996 | Wurst et al. |
| 5,524,870 | A | 6/1996 | Tallent et al. |
| 5,562,394 | A | 10/1996 | Brown, Jr. |
| 5,593,113 | A | 1/1997 | Cox |
| 5,613,722 | A | 3/1997 | Fandrich et al. |
| 5,816,098 | A | 10/1998 | Kanki et al. |
| 5,816,636 | A | 10/1998 | Gibson et al. |
| 5,871,249 | A | 2/1999 | Williams |
| 5,898,746 | A | 4/1999 | Baversten et al. |
| 5,927,438 | A | 7/1999 | Ostrobrod |
| 5,961,563 | A | 10/1999 | Overton |
| 6,189,834 | B1 | 2/2001 | Dietz et al. |
| 6,199,793 | B1 | 3/2001 | Hainsworth et al. |
| 6,439,407 | B1 | 8/2002 | Jacoff et al. |
| 6,533,220 | B2 | 3/2003 | Schuster |
| D473,482 | S | 4/2003 | Felmingham |
| 6,578,796 | B2 | 6/2003 | Maeda |
| 6,708,926 | B2 | 3/2004 | Bonisch |
| 6,814,185 | B1 | 11/2004 | Ostrobrod |
| 6,983,833 | B2 | 1/2006 | Ivers et al. |
| 7,028,351 | B1 | 4/2006 | Frieder et al. |
| 7,131,515 | B2 | 11/2006 | Gartsbeyn et al. |
| 7,267,240 | B2 | 9/2007 | Maurer et al. |
| 7,720,582 | B2 | 5/2010 | Makinadjian |
| D617,293 | S | 6/2010 | Yoshihashi |
| 7,887,011 | B1 | 2/2011 | Baldwin |
| 7,948,237 | B2 | 5/2011 | Kuzmin et al. |
| 8,131,384 | B2 | 3/2012 | Karpman et al. |
| 8,157,205 | B2 | 4/2012 | McWhirk |
| 8,226,042 | B1 | 7/2012 | Howell et al. |
| 8,231,083 | B2 | 7/2012 | Kutzmann et al. |
| 8,292,229 | B2 | 10/2012 | Pancotti et al. |
| D671,293 | S | 11/2012 | Fredriksson |
| 8,413,923 | B2 | 4/2013 | Brenner et al. |
| 8,496,279 | B2 | 7/2013 | Aoki |
| 8,534,607 | B2 | 9/2013 | Tardiff et al. |
| 8,534,608 | B1 | 9/2013 | Cox, IV |
| 8,591,161 | B1 | 11/2013 | Bernhardt |
| 8,840,355 | B1 | 9/2014 | Kulesha |
| 8,886,402 | B1 | 11/2014 | Lou |
| 8,888,048 | B2 | 11/2014 | Figoureux et al. |
| 8,894,050 | B2 | 11/2014 | Wootten et al. |
| 8,899,903 | B1 | 12/2014 | Saad et al. |
| 8,903,568 | B1 | 12/2014 | Wang et al. |
| 8,925,901 | B2 | 1/2015 | Gaillard |
| 8,938,325 | B1 | 1/2015 | McGinnis et al. |
| 8,967,533 | B2 | 3/2015 | DeVaul et al. |
| 9,027,976 | B1 | 5/2015 | Tollenaere |
| 9,096,294 | B1 | 8/2015 | Dong et al. |
| 9,114,871 | B2 | 8/2015 | Woodworth et al. |
| 9,194,977 | B1 | 11/2015 | Dungan et al. |
| 9,205,922 | B1 | 12/2015 | Bouwer |
| 9,223,008 | B1 | 12/2015 | Hartman et al. |
| 9,242,741 | B1 | 1/2016 | Cockell |
| 9,302,770 | B2 | 4/2016 | Burgess et al. |
| 9,375,841 | B1 | 6/2016 | Kemper |
| 9,422,139 | B1 | 8/2016 | Bialkowski et al. |
| 9,676,481 | B1 | 6/2017 | Buchmueller |
| 9,688,404 | B1 | 6/2017 | Buchmueller et al. |
| 9,797,723 | B1 | 10/2017 | Huang |
| 9,800,091 | B2 | 10/2017 | Nugent, Jr. et al. |
| 9,836,063 | B1 | 12/2017 | Bonawitz et al. |
| 9,849,981 | B1 | 12/2017 | Burgess et al. |
| 9,850,113 | B2 | 12/2017 | Melin et al. |
| 9,881,506 | B1 | 1/2018 | Gentry |
| 9,908,756 | B2 | 3/2018 | Heravi et al. |
| 9,958,876 | B2 | 5/2018 | Lind et al. |
| 10,023,312 | B2 | 7/2018 | Repp et al. |
| 10,023,313 | B2 | 7/2018 | Behrens et al. |
| 10,071,804 | B1 | 9/2018 | Buchmueller et al. |
| 10,112,805 | B1 | 10/2018 | Joralmon |
| 10,286,943 | B1 | 5/2019 | Greenblatt et al. |
| 10,288,075 | B2 | 5/2019 | Ishiba |
| 10,451,504 | B2 | 10/2019 | Campbell et al. |
| 10,479,503 | B2 | 11/2019 | Sikora et al. |
| 10,519,013 | B2 | 12/2019 | Curran et al. |
| 10,676,190 | B2 | 6/2020 | Mitchell et al. |
| 10,870,558 | B2 | 12/2020 | Sikora et al. |
| 10,899,586 | B2 | 1/2021 | Cranney, III |
| 10,918,892 | B2 | 2/2021 | Dickson |
| 10,940,061 | B2 | 3/2021 | Sikora et al. |
| 10,960,976 | B2 | 3/2021 | Bosma et al. |
| 11,008,198 | B2 | 5/2021 | Sikora et al. |
| 11,142,316 | B2 | 10/2021 | Sikora et al. |
| 11,142,433 | B2 | 10/2021 | Sikora et al. |
| 11,209,836 | B1 | 12/2021 | Sikora et al. |
| 11,339,034 | B2 | 5/2022 | Sikora et al. |
| 11,370,642 | B2 | 6/2022 | Markwell et al. |
| 11,535,496 | B2 | 12/2022 | Al-Husseini et al. |
| 2002/0113448 | A1 | 8/2002 | Kazerooni et al. |
| 2003/0085319 | A1 | 5/2003 | Wagner et al. |
| 2003/0121024 | A1 | 6/2003 | Hill et al. |
| 2003/0220177 | A1 | 11/2003 | Orlando |
| 2004/0026349 | A1 | 2/2004 | Colgate et al. |
| 2004/0032140 | A1 | 2/2004 | Solstad |
| 2005/0072965 | A1 | 4/2005 | Sanders et al. |
| 2005/0242237 | A1 | 11/2005 | Scott |
| 2006/0163892 | A1 | 7/2006 | Nguyen et al. |
| 2007/0200032 | A1 | 8/2007 | Eadie et al. |
| 2008/0027566 | A1 | 1/2008 | Baek et al. |
| 2008/0272566 | A1 | 11/2008 | Thompson |
| 2009/0004004 | A1 | 1/2009 | Vincenzi |
| 2009/0152391 | A1 | 6/2009 | McWhirk |
| 2009/0200428 | A1 | 8/2009 | Smith et al. |
| 2010/0000349 | A1 | 1/2010 | Stevens et al. |
| 2010/0012771 | A1 | 1/2010 | Jess |
| 2010/0176618 | A1 | 7/2010 | Souke et al. |
| 2010/0237183 | A1 | 9/2010 | Wilson et al. |
| 2010/0291707 | A1 | 11/2010 | Mirkin et al. |
| 2010/0319910 | A1 | 12/2010 | Ives et al. |

(56) References Cited

U.S. PATENT DOCUMENTS

2011/0192932 A1 8/2011 Brenner et al.
2012/0006779 A1 1/2012 Mills et al.
2012/0145832 A1 6/2012 Schuster
2012/0150364 A1 6/2012 Tillotson et al.
2012/0271582 A1 10/2012 Bageshwar et al.
2012/0292434 A1 11/2012 Welsh
2012/0293177 A1 11/2012 Dodds
2013/0054054 A1 2/2013 Tollenaere et al.
2013/0056586 A1 3/2013 Occhiato et al.
2013/0081245 A1 4/2013 Vavrina et al.
2013/0270393 A1 10/2013 Shrapnel
2013/0299634 A1 11/2013 Haggard
2014/0154965 A1 6/2014 Han et al.
2014/0224755 A1 8/2014 Eriksson et al.
2014/0262170 A1 9/2014 Prud'Homme-Lacroix
2014/0333232 A1 11/2014 Verheyen
2015/0041598 A1 2/2015 Nugent et al.
2015/0151837 A1 6/2015 Sane et al.
2015/0360779 A1 12/2015 Behrens et al.
2016/0009393 A1 1/2016 Repp et al.
2016/0009531 A1 1/2016 Saliba et al.
2016/0031683 A1 2/2016 Fenker et al.
2016/0048131 A1 2/2016 Lesperance et al.
2016/0236779 A1 8/2016 Thomas et al.
2016/0240417 A1 8/2016 Tomida
2016/0297650 A1 10/2016 Bang et al.
2016/0298962 A1 10/2016 Lee
2016/0332728 A1 11/2016 Winfree et al.
2016/0340030 A1 11/2016 Roussey et al.
2016/0340035 A1 11/2016 Duru
2016/0340039 A1 11/2016 Waltner et al.
2017/0009859 A1 1/2017 Sevagen
2017/0052676 A1 2/2017 Pulier et al.
2017/0073055 A1 3/2017 Song
2017/0088261 A1 3/2017 Sequeira et al.
2017/0129749 A1 5/2017 Mijangos et al.
2017/0138737 A1 5/2017 Cordova et al.
2017/0197718 A1 7/2017 Buchmueller
2017/0217566 A1 8/2017 Ichinose
2017/0276139 A1 9/2017 Ishiba
2017/0284795 A1 10/2017 Carlson et al.
2017/0291707 A1 10/2017 Veronesi et al.
2018/0072404 A1 3/2018 Prager et al.
2018/0099748 A1 4/2018 Lesperance et al.
2018/0208309 A1 7/2018 Wang
2018/0229855 A1 8/2018 Sane et al.
2018/0251346 A1 9/2018 Thomson et al.
2018/0252616 A1 9/2018 Bryson et al.
2018/0282130 A1 10/2018 Kale et al.
2018/0339891 A1 11/2018 Ijadi-Maghsoodi et al.
2019/0016480 A1 1/2019 Kashiwa et al.
2019/0031474 A1 1/2019 Stilborn et al.
2019/0033892 A1 1/2019 Gomez et al.
2019/0055111 A1 2/2019 Cranney, III
2019/0193827 A1 6/2019 Zerweckh
2019/0236370 A1 8/2019 Man
2019/0241267 A1 8/2019 Sikora et al.
2019/0337776 A1 11/2019 Fanello et al.
2020/0087121 A1 3/2020 Ohayon et al.
2020/0165010 A1 5/2020 Sun et al.
2020/0180763 A1 6/2020 Schütz et al.
2020/0182252 A1 6/2020 Nakasuji et al.
2020/0210704 A1 7/2020 Han et al.
2020/0222257 A1 7/2020 Sikora et al.
2020/0231415 A1 7/2020 Sikora et al.
2020/0271270 A1 8/2020 Sikora et al.
2020/0369492 A1 11/2020 Sikora et al.
2020/0400330 A1 12/2020 Przybylski et al.
2021/0371250 A1 12/2021 Bedgood et al.
2021/0371252 A1 12/2021 Sikora et al.
2022/0121225 A1 4/2022 Sikora et al.
2022/0135378 A1 5/2022 Sikora et al.
2022/0274696 A1 9/2022 Sikora et al.
2022/0274809 A1 9/2022 Sikora et al.
2022/0277472 A1 9/2022 Birchfield et al.
2022/0281721 A1 9/2022 Sikora et al.
2022/0371736 A1 11/2022 Sikora et al.
2023/0117935 A1 4/2023 Al-Husseini et al.

FOREIGN PATENT DOCUMENTS

GB 2457149 A 8/2009
GB 2513646 A 11/2014
JP H04256686 9/1992
JP H0543184 2/1993
JP H05193584 8/1993
JP H07179288 7/1995
JP H09317795 12/1997
JP H10305989 11/1998
JP H1111859 1/1999
JP 2016210607 A 12/2016
JP 2017500257 A 1/2017
JP 2018140860 A 9/2018
JP 6554258 7/2019
NO 20171181 1/2019
WO 2011012915 2/2011
WO 2014076189 5/2014
WO 2018090104 5/2018
WO 2018234670 12/2018

OTHER PUBLICATIONS

Extended European Search Report and Search Opinion, Application No. EP 19 751 097.7, mailed Aug. 31, 2021, 15 pages.
Internal Search Report mailed Apr. 30, 2020 for PCT/US2020/017790, filed Feb. 11, 2020.
International Search Report dated Apr. 3, 2019, for PCT/US19/13603 filed Jan. 15, 2019.
International Search Report in PCT/US2020/062414, mailed Feb. 19, 2021, entire document.
International Search Report mailed May 27, 2020 for PCT.US20/19967 filed Feb. 26, 2020.
International Search Report mailed Oct. 6, 2020, for PCT/US2020/042936, filed Jul. 2020.
Phillip J. Mckerrow, The design of a tethered aerial robot, Faculty of informatics—Papers (Archive) Faculty of Engineering and InformationSciences University of Wollongong, Oct. 4, 2007, pp. 1-8, University of Wollongong, Australia, https://ro.uow.edu.au/infopapers/519.
Written Opinion in PCT/US2020/062414, mailed Feb. 19, 2021, entire document.
Written Opinion mailed Apr. 3, 2019, for PCT/US19/13603, filed Jan. 15, 2019.
Written Opinion mailed May 27, 2020, for PCT/US20/19967, filed Feb. 26, 2020.
Written Opinion mailed Oct. 6, 2020 for PCT/US2020/042936 filed Jul. 21, 2020.
Young, L.A , "Enhanced Rescue Lift Capability", 63rd Annual Forum of the AHS international, Virginia Beach, VA, May 1-3, 2007 (May 2007), FIG.2,5,12,16, Abstract pp. 6-12.

DEVICE FOR STABILIZING A HOISTED OBJECT

CROSS-REFERENCE TO RELATED APPLICATIONS

This application claims the benefit of and priority to U.S. Non-Provisional patent application Ser. No. 16/360,075, titled, "DEVICE FOR STABILIZING A HOISTED OBJECT", filed Mar. 21, 2019, to issue as U.S. Pat. No. 11,535,496 on Dec. 27, 2022, which application claims the benefit of and priority to U.S. Provisional Patent Application No. 62/677,177, titled "FLYWHEEL-BASED MECHANISM FOR STABILIZING HELICOPTER HOISTS," filed May 28, 2018; the contents of the foregoing applications are incorporated herein by reference in their entirety.

BACKGROUND

Hoisted objects have a tendency to spin while being lifted under a helicopter. This spin is particularly problematic for aeromedical evacuations. The existing means of stabilizing a hoisted object are tag lines and active fins. A tag line is a line connecting the hoisted object to the ground. While the tag line can be simple and effective, it requires an individual on the ground to connect and disconnect the line. This limits the use of the tag line in certain environments. The active fin changes its angle of attack in response to an internal gyroscope which senses the angular velocity of an airframe. The protruding nature of the active fin off the airframe results in a tendency for the fin to fall to the ground mid operation. This is especially true when confronted with dense terrain. Existing methods for stabilizing a hoisted object during a helicopter hoist operation are thus less than ideal.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
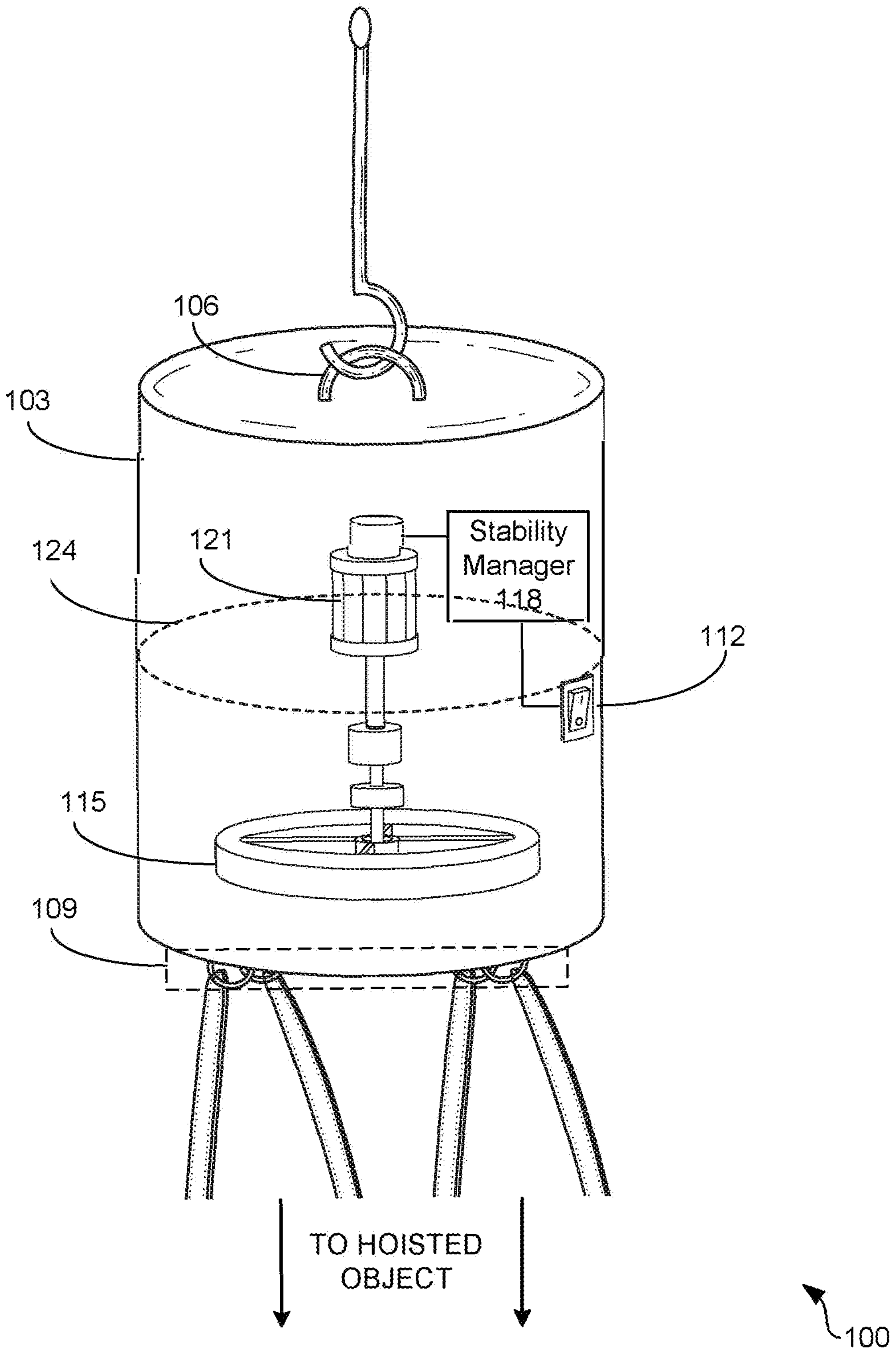
FIG. 1 shows an example of a device for stabilizing a hoisted object in accordance with various embodiments of the present disclosure.

The present disclosure relates to a device that counteracts a spin of a hoisted object during a hoist operation. The device provides an alternative to a tag line and other conventional methods to counteract the spin of a litter that can occur when the litter is hoisted by a helicopter. In contrast to conventional methods of counteracting spin, the device described herein does not require hoist personnel to hold a tag line or otherwise maintain an ascertainable position during a hoist operation.

A hoist operation typically involves a helicopter or other aircraft with a hydraulic power unit (HPU) that reels a lift line to the ground so that a hoisted object such as a litter can be attached to the lift line. In certain environments, the litter is a flexible stretcher such as a Skedco® Sked® stretcher, or the litter may be a metal frame basket such as a Stokes basket. The lift line from the helicopter includes a hook for connecting to the litter. Once the hook is connected to the litter, the HPU can reel the lift line in so that the litter can be retrieved. The design of a litter, various forces that exist during hoist operations, and other variables can cause the litter to spin prior to being retrieved.

It can be desirable to counteract the spin of a litter during a hoist operation without using a tag line. A tag line, such as the Skedco® Helitag Helicopter Tag Line Kit, is part of a manual process that involves an individual holding a rope that is connected to the litter. The manual process usually requires the individual to remain at a fixed point or otherwise ascertainable position, which can be problematic over water or in certain environments.

According to various embodiments describes herein, a system, device, or method can include a stability manager or use thereof that may be employed as a component of a helicopter hoist operation to stabilize a hoisted object. The device of the present disclosure contains a switch that can be turned on by an individual on the ground who is responsible for connecting an enclosure containing the stability manager to the hoisted object, and turned off by an individual retrieving the hoisted object in the helicopter.

The enclosure is connected to the hoisted object, and therefore spins with the same angular velocity as the hoisted object. An inertial-measurement unit (IMU) can sense angular velocity of the enclosure. The IMU senses the angular velocity of the enclosure, and therefore by the nature of the connection between the enclosure and the hoisted object, the IMU senses a measurement that corresponds with the angular velocity of the hoisted object.

The device can include any number of motors, drivers, flywheels, and sensors, as well as a processor. The combination of motors being driven to turn flywheels induces the necessary stabilizing torque. Sensors read various measurements such as an angular velocity that corresponds with a hoisted object and provide those measurements to a processor. A control-feedback algorithm uses the angular velocity, and potentially acceleration, of the enclosure to inform how to control the flywheel. Ultimately, spinning the flywheel in the same direction as the hoisted object can help to stabilize the hoisted object.

Two categories of control-feedback algorithms can be used towards this purpose: proactive and reactive. The proactive algorithm can include the addition of a load sensor to determine the angular momentum of the hoisted object. A load sensor can also be useful when aspects of the geometry and the mass distribution of a hoisted object are known. The angular momentum informs the selection of the angular velocity of the flywheel to counteract the angular momentum of the hoisted object. Alternatively, a reactive approach can be used where the flywheel increases or decreases in velocity depending on the current rotation of the hoisted object.

Turning to the drawings, FIG. 1 shows an example of a device 100 for stabilizing a hoisted object in accordance with various embodiments of the present disclosure. The example device 100 includes an enclosure 103, a line attachment 106, a hoisted object attachment 109, and a switch 112.

As the enclosure 103 can be formed from any suitable type(s) of material to meet or exceed United States Military Standards and/or other design specifications. The enclosure 103 can resist shock damage, corrosion, and other environmental effects. The enclosure 103 can be formed of non-conductive material such as polyvinyl chloride (PVC). It is envisioned that the enclosure 103 can also include a conductive material such as metal or steel to discharge static electricity. The enclosure 103 provides a line attachment 106 for connection to a lift line reeled down from a helicopter, and a hoisted object attachment 109 for connection up from the hoisted object. A steel wire or other conductive material connects to a hook of the lift line to discharge static electricity from the helicopter.

The line attachment 106 includes a connection point to attach to a hook of a lift line. The hoisted object attachment 109 includes two or more connection points to connect to a hoisted object through two or more straps or lines. The hoisted object can be a Skedco® Sked® litter with a horizontal lift sling that has a head strap and a foot strap. This hoisted object provides four attachment points (e.g., two loops creating four ends).

In some examples, the hoisted object attachment 109 allows the attachment points of the hoisted object to collect together and meet at one connection point. Alternatively, the hoisted object attachment 109 allows ends or connections from the hoisted object to connect to the device 100. In either of these examples, the hoisted object attachment 109 thus provides an attachment such that that the device 100 rotates about an axis formed by the lift line to the extent to which the hoisted object rotates. The hoisted object attachment 109 also allows straps of the hoisted object to be attached to the enclosure 103 without having to modify the straps.

Next, an example operation of the device 100 stabilizing a hoisted object is described. The switch 112, for example a rocker switch, can be actuated to cause the device 100 to begin stabilizing a hoisted object and to counteract a spin of the hoisted object during a hoist operation. The device 100 depicted in FIG. 1 includes a flywheel 115 and various other components that will be described in further detail below.

Operation of the device 100 applies torque to the enclosure 103 thus reducing angular momentum of the spinning hoisted object. The device 100 can be calibrated so that operation of the device 100 allows the flywheel 115 to have a similar angular momentum as the hoisted object, thus storing the angular momentum of the hoisted object by transferring it to the flywheel 115.

In operation, the stability manager 118 can be electrically connected to the motor 121 and the switch 112. The stability manager 118 can be implemented with hardware, firmware, software executed by hardware, or a combination thereof. For example, the stability manager 118 can include processing circuitry including a processor and a memory, both of which can be coupled to a local interface such as, for example, digital and/or analog input-output pins as can be appreciated by those with ordinary skill in the art. The stability manager 118 can include software that configures the processor to use the input-output pins to interface with various components.

A stability application 256 (FIG. 2B) may be executed by the processor 253 (FIG. 2B) to monitor stability of the hoisted object and adjust the angular velocity of the flywheel 115 to stabilize the hoisted object. The stability manager 118 can also include one or more network interfaces for communicating with the various components.

Communications can be through a network such as, but not limited to, a WLAN, cellular network, Bluetooth®, or other appropriate communication network. The stability manager 118 may comprise, for example, a system such as a microcontroller, a system on chip, integrated circuit, or other system with like capability.

The stability manager 118 reads a measurement corresponding to an angular momentum of the hoisted object while the lift line is retrieved by the HPU. A processor 253 (FIG. 2B) of the stability manager 118 runs the measurement through a PID loop in a stability application 256 (FIG. 2B) of the stability manager 118. The stability application 256 can select a value for a voltage across the motor 121 that causes the motor 121 to spin. Operation of the device 100 results in a torque to counteract the spin of the hoisted object.

The device 100 can stabilize the hoisted object by using one adjustment or by using multiple adjustments. If the hoisted object is rotating clockwise (or counter-clockwise), the device 100 can cause the flywheel 115 to rotate clockwise (or counter-clockwise). The stability application 256 can get a measurement for angular velocity from an IMU of the sensor pack 259 (FIG. 2B) and continue to adjust the voltage to drive the motor 121, which adjusts the angular velocity of the flywheel 115. The stability application 256 can continue to get measurements to determine that the angular velocity of the hoisted object gets closer and closer to zero. The process can continue until the hoisted object stops spinning or until the spinning is within a defined tolerance. The stability application 256 can allow the flywheel 115 to spin freely.

Operation of the device 100 can result in a torque to counteract the spin of the hoisted object, due in part to the motor 121 being rigidly connected to the blind flange 124, which is itself rigidly connected to the enclosure 103. In some examples, the motor 121 and/or a portion of a stabilizer assembly of the device 100 can be rigidly connected directly to the enclosure 103. The device 100 can cause the motor 121 to apply a torque to the enclosure 103 and stabilize the hoisted object.

Figure 2A:
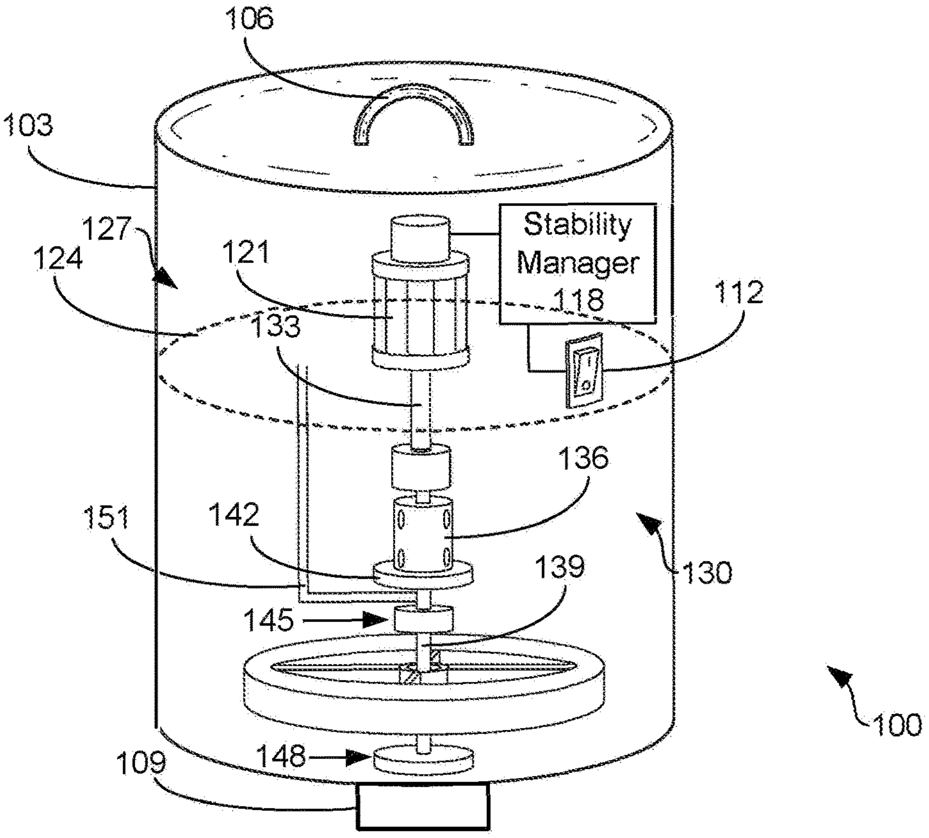
FIG. 2A shows an example of a device for stabilizing a hoisted object in accordance with various embodiments of the present disclosure.

Referring now to FIG. 2A, shown is an example of a device 100 for stabilizing a hoisted object in accordance with various embodiments of the present disclosure. The enclosure 103 includes a blind flange 124 which creates a top compartment 127 and a bottom compartment 130 within the enclosure 103.

Figure 2B:
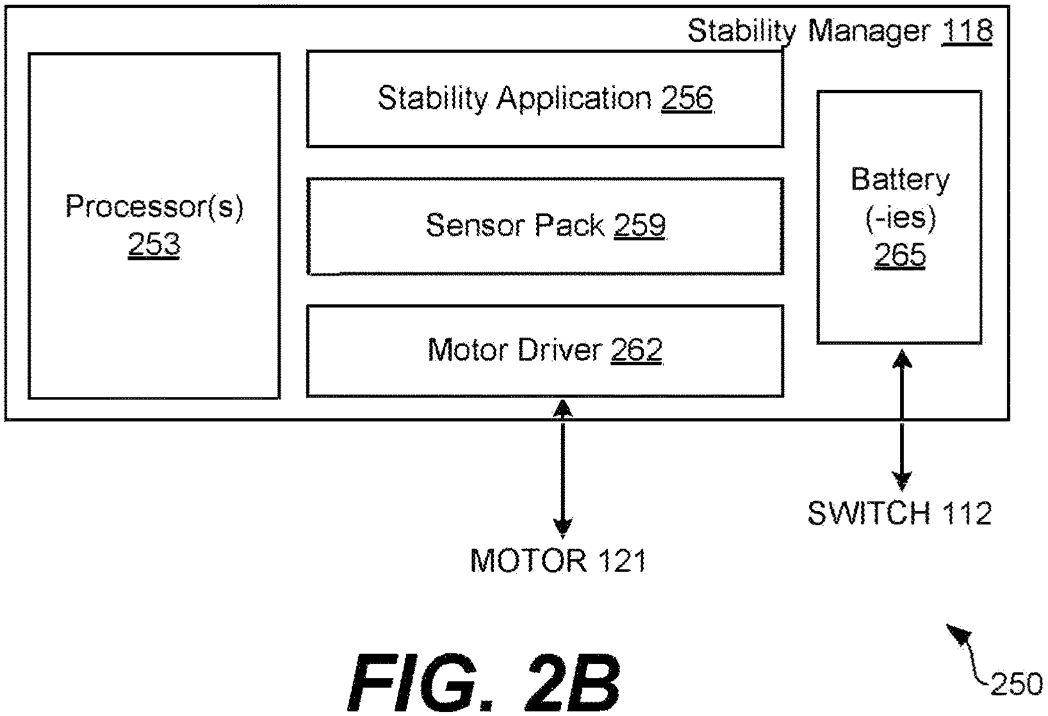
FIG. 2B shows an example block diagram of a stability manager of a device for stabilizing a hoisted object in accordance with various embodiments of the present disclosure.

The top compartment 127 houses a stability manager 118 (as also depicted in FIG. 2B). The stability manager 118 can adjust the voltage that drives the motor 121 (e.g., using a proportional-integral-derivate (PID) control or other feedback control algorithm, which is being represented by stability application 256 in FIG. 2B). The stability application 256 takes data from an IMU of the sensor pack 259 (FIG. 2B), feeds the data into the PID algorithm, and determines a desired angular velocity for the motor 121, which the motor driver 262 can carry out on the motor 121.

While the stability manager 118 (and the IMU) is depicted on the inside of the enclosure 103, the IMU could also be on the outside of the enclosure 103 or located remotely from the enclosure 103. The IMU can be placed in a location that will allow the IMU to provide accurate measurements, such as near to an axis on which the enclosure 103 and/or the hoisted object is rotating. The enclosure 103 can, for example, be spinning about an axis formed by the lift line attached to the enclosure 103.

The device 100 includes a stabilizer assembly where a portion of the stabilizer assembly can be rotated to reduce the angular velocity of the hoisted object. The stabilizer assembly includes the motor 121 as well as various components housed within the bottom compartment 130. The stabilizer assembly is configured to transfer a torque to the hoisted object. For example, the hoisted object is connectable to the hoisted object attachment 109 of the enclosure 103. The motor 121 can be mounted to the blind flange 124 that is rigidly connected to the enclosure 103. Drive of the motor 121 can cause a torque to be transferred to the hoisted object by the nature of the connection between the enclosure 103 and the hoisted object.

The motor 121 can be mounted so that a first drive shaft 133 coming off the motor 121 protrudes through the blind flange 124. The motor driver 262 (FIG. 2B) drives the motor 121 based on the output from the stability application 256. The motor 121 is connected to the flywheel 115. The drive of the motor 121 causes the flywheel 115 to spin in the same direction as the hoisted object.

The bottom compartment 130 houses the portion of the first drive shaft 133 that protrudes through the blind flange 124 and connects to the shaft coupler 136. The shaft coupler 136 is used to connect the first drive shaft 133 and a second drive shaft 139 that is connected to the flywheel 115. The shaft coupler 136 can join the first drive shaft 133 and the second drive shaft 139 to permit transfer of rotation, while also permitting movement or angular misalignment between the first drive shaft 133 and the second drive shaft 139. For example, the shaft coupler 136 can permit about two to three degrees of angular misalignment. A second drive shaft 139 is connected to the shaft coupler 136 and the flywheel 115. An encoder 142 is provided so that the stability manager 118 can sense how quickly the second drive shaft 139 is spinning. A first shaft collar 145 and a second shaft collar 148 can hold the flywheel 115 in place. The bracket 151 mounts the shaft coupler 136 to a head of the motor 121 and/or the blind flange 124. The shaft coupler 136 counteracts any tilting of components of the device 100.

A weight of the flywheel 115 can be selected based on how quickly it is desired for the flywheel 115 to turn and how quickly the flywheel 115 accelerates. For example, a flywheel 115 can be between about five and twenty pounds. It is also envisioned that the device 100 could include multiple flywheels 115. The device 100 can spin the flywheel 115 in the same direction as the hoisted object is spinning. The device 100 can apply a torque to the enclosure 103 which will then transfer to the hoisted object and counteract the spinning of the hoisted object. Additionally, controlling multiple flywheels 115 in multiple axis can lead to stabilization in multiple axis. Controlling multiple flywheels 115 can allow the device 100 to stabilize a hoisted object that is oscillating back and forth, spinning about a fixed axis, etc.

Although an electromechanical rocker switch 112 is depicted in FIG. 2A, other types of switches are envisioned. One purpose of the switch 112 is to preserve the battery life of the device 100 (in the off position) and to start current flowing into the stability manager 118 (in the on position). The switch 112 could be a wireless or remote control switch that can achieve an off state when it is not desired for the device 100 to stabilize the hoisted object, and an on state when it is desired for the device 100 to stabilize the hoisted object. The switch 112 could determine if the hoisted object is being hoisted and then switch to an on or active position. When the hoisted object is no longer being hoisted, the switch 112 could switch to an off or inactive position. Additionally, conductive material runs from the line attachment 106 to the hoisted object attachment 109 to discharge static electricity from the helicopter.

With reference now to FIG. 2B, shown is an example block diagram 250 of a stability manager 118 of a device 100 for stabilizing a hoisted object in accordance with various embodiments of the present disclosure. The stability manager 118 can include a processor 253, a stability application 256, a sensor pack 259, a motor driver 262, and a battery 265 or other power supply. The motor driver 262 is the connection point from the processor 253 to the motor 121. For example, the motor driver 262 can be a hardware interface that the processor 253 uses to control the speed and the direction of the motor 121 by controlling an input voltage to the motor 121.

The sensor pack 259 can include one or more sensors. In some examples, the sensor pack 259 includes an inertial measurement unit (IMU) that comprises the one or more sensors. Sensors can include an accelerometer, a gyroscope, a magnetometer, or a device that measures a force, angular rate, or magnetic field. The sensor pack 259 can also be electrically connected to the encoder 142 that detects rotation at some sensor point such as around the second drive shaft 139. The IMU of the sensor pack 259 detects angular velocity and angular acceleration. The stability manager 118 can thus sense rotation of the enclosure 103 via the IMU and detect rotation of the flywheel 115 using the encoder 142.

The stability application 256 can include a proportional-integral-derivative (PID) controller that implements a control algorithm. The stability application 256 reads at least one measurement (angular velocity) from the sensor pack 259 and outputs a voltage based on a velocity and/or direction to cause the flywheel 115 to spin. The stability application 256 can continue to get measurements to determine that the angular velocity of the hoisted object gets closer and closer to zero.

Figure 3:
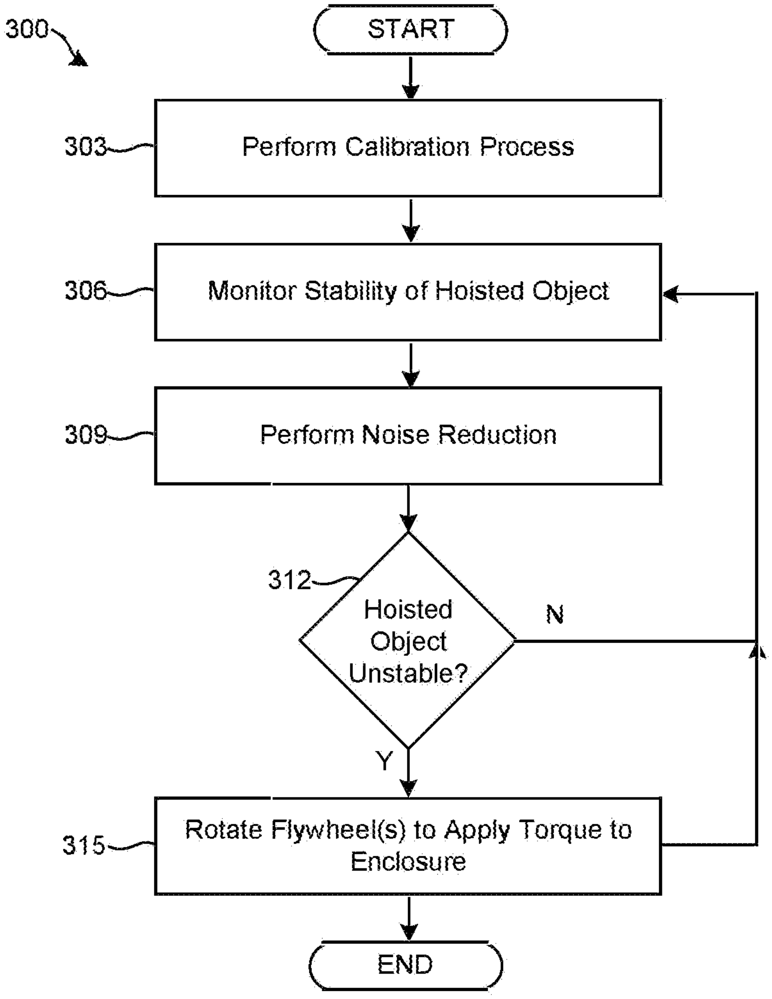
FIG. 3 shows an example flow chart of a stability manager for a device for stabilizing a hoisted object in accordance with various embodiments of the present disclosure.

With reference to FIG. 3, shown is a flowchart 300 that shows steps of a method implemented by the stability manager 118. Alternatively, FIG. 3 provides one example of the execution of a stability application 256 of a device 100 for stabilizing a hoisted object in accordance with various embodiments of the present disclosure. FIG. 3 can also be seen as example flowchart 300 for a control system for a device 100 for stabilizing a hoisted object in accordance with various embodiments of the present disclosure.

Accordingly, at box 303, the stability manager 118 can perform a calibration process for stabilizing the hoisted object. For example, the stability application 256 can use a calibration process to obtain a reference point or calibration constants. For example, a point relative to an initial orientation (relative orientation), a position (absolute position), or relative to magnetic north (absolute orientation) can be obtained by input from an operator or by reading one or more values from the sensor pack 259. Prior to the hoist operation while the device 100 is stable, the device 100 can be calibrated.

At box 306, the stability manager 118 can set a threshold for the stability operation. For example, the stability application 256 can set a defined number of revolutions per second below which a hoisted object is deemed to be stable. The stability application 256 can monitor the sensor pack 259, as calibrated in box 303. For example, the stability application 256 can obtain from the sensor pack 259 a measurement that corresponds with the angular velocity of the hoisted object. Accordingly, with the sensor pack 259 in place, the rotation of the enclosure 103 and/or the hoisted object can be sensed.

At box 309, the stability application 256 can perform a noise reduction analysis on one or more measurements obtained from the sensor pack 259. The analysis uses the processor 253 to compute one or more reduced samples based on measurement(s) obtained from the sensor pack 259. For example, a sensor pack 259 having a 200 Hz IMU would have a sample period of 5 milliseconds. The reduced samples can be based on a sample period that is greater than 5 milliseconds. One benefit of the noise reduction is to reduce the likelihood that the device 100 will overcompensate for a spin or jerk the hoisted object.

At box 312, the stability application 256 can determine whether the hoisted object is unstable. The hoisted object attachment 109 of the enclosure 103 is connected to the hoisted object, and therefore spins with the same angular velocity as the hoisted object. The IMU of the sensor pack 259 can sense angular velocity of the enclosure. The IMU senses the angular velocity of the enclosure 103, and therefore by the nature of the connection between the enclosure 103 and the hoisted object, the IMU senses a measurement that corresponds to the angular velocity of the hoisted object.

For example, if the sensor pack 259 detects a measurement that is above a threshold defined in box 303, this condition can be associated with an unstable hoisted object. The stability application 256 can determine that the hoisted object is unstable because it is spinning in one axis. If the stability application 256 determines that the hoisted object is unstable, the process continues to box 315.

If the stability application 256 determines that the stability of the hoisted object is within a threshold, this condition can be associated with a hoisted object that is stable. The stability application 256 can determine that the hoisted object is no longer spinning, or that the hoisted object is spinning within a tolerance of at least one sensor making up the sensor pack. The stability application 256 can also determine that the hoisted object is spinning less than a fixed number of revolutions per second. If the hoisted object is stable, then the process can return to box 306. Alternatively, in some implementations, the process can end if the hoisted object is considered stable.

At box 315, the stability application 256 can adjust voltage of the motor 121. The stability application 256 can instruct the motor driver 262 to drive the motor 121 and rotate at least one drive shaft attached to the flywheel(s) 115. Driving the motor 121 can result in the application of torque to the enclosure 103. The stability application 256 integrates measurements from the IMU of the sensor pack 259 so that angular velocity input informs the velocity and direction of the flywheel 115.

The stability application 256 can implement a PID controller to adjust the voltage of the motor 121 due to at least one measurement detected by the sensor pack 259. For example, the voltage of the motor 121 can be adjusted based on the direction and the angular velocity of the hoisted object. The voltage of the motor 121 can be controlled so the angular velocity of the flywheel 115 counteracts the angular momentum of the hoisted object. For example, the PID controller can implement a control equation (1) where V is the output voltage to the motor 121, m is the difference between the angular velocity of the hoisted object about the z-axis compared to desired angular velocity. The kp, k, and kd values can be selected. Thereafter, the process can return to box 306. Alternatively, in some implementations, the process can proceed to completion.

$$V = k_p\omega + k_i\int \omega dt + k_d\frac{d\omega}{dt} \quad (1)$$

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted (in favor, e.g., conventional scanning approaches). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the stability manager 118, and the stability application 256, can be implemented using dedicated circuitry or implemented using hardware and software such as a microcontroller and software running on the microcontroller.

The device 100 can be formed from any suitable type(s) of materials to meet or exceed United States Military Standards and/or other design specifications. While the device 100 is depicted as attached above the litter or hoisted object, the device 100 could also be connected to (or inside of) a bottom of the litter. The device 100 can thus be fitted to any litter.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An apparatus to transfer an angular momentum between a hoisted object and a flywheel, comprising:

an enclosure, an inertial measurement unit (IMU), the flywheel, a motor, a proportional-integral-derivative (PID) motor controller, a hoisted object attachment, a line attachment, a computer processor and a memory, and instructions for a stability application in the memory;

wherein the enclosure is to be coupled to the hoisted object via the hoisted object attachment, the enclosure is to be coupled to a hoist via the line attachment, the IMU is to detect at least one of an angular acceleration and an angular velocity of the enclosure, the motor is coupled to the flywheel, and wherein the flywheel is within the enclosure;

wherein to transfer the angular momentum between the hoisted object and the flywheel, the stability application is to obtain the angular acceleration or the angular velocity of the enclosure from the IMU, determine a difference between a setpoint and the angular acceleration or the angular velocity of the enclosure from the IMU, process the difference with a proportionate term, an integral term, and a derivative term of the PID motor controller, determine an output voltage to be sent to the motor according to the proportionate term, the integral term, and the derivative term of the PID motor controller, send the output voltage to the motor, and thereby change an acceleration of the flywheel and transfer angular momentum between the hoisted object and the flywheel to drive the hoisted object toward the setpoint.

2. The apparatus according to claim 1, wherein the motor is mounted to a blind flange within the enclosure, wherein a driveshaft of the motor and an axis of rotation of the flywheel are aligned with the hoisted object attachment and the line attachment.

3. The apparatus according to claim 2, wherein the IMU is located on the axis of rotation of the flywheel aligned with the hoisted object attachment and the line attachment to provide an accurate measurement from the IMU.

4. The apparatus according to claim 1, wherein further comprising a shaft coupler between the motor and the flywheel, wherein the shaft coupler permits two to three degrees of angular misalignment between the motor and the flywheel.

5. The apparatus according to claim 1, wherein the setpoint comprises one of a target angular rate of the enclosure or an orientation of the enclosure.

6. The apparatus according to claim 1, wherein to transfer the angular momentum between the hoisted object and the flywheel, the stability application is further to determine a desired angular velocity of the flywheel, wherein the desired angular velocity of the flywheel is to transfer angular momentum between the hoisted object and the flywheel to drive the hoisted object toward the setpoint.

7. The apparatus according to claim 6, wherein the apparatus further comprises an encoder, wherein the encoder is to detect an angular velocity of the flywheel relative to the enclosure, wherein the desired angular velocity of the flywheel is to transfer angular momentum between the hoisted object and the flywheel to drive the hoisted object toward the setpoint.

8. The apparatus according to claim 6, wherein the stability application is further to obtain a measurement corresponding to an angular momentum of the hoisted object and is to use the measurement corresponding to the angular momentum of the hoisted object to determine the desired angular velocity of the flywheel.

9. The apparatus according to claim 8, wherein the measurement corresponding to the angular momentum of the hoisted object comprises a measurement from a load sensor.

10. The apparatus according to claim 1, wherein the stability application is further to perform a noise reduction on at least one of the angular acceleration and the angular velocity detected by the IMU in order to reduce a likelihood of overcompensation for a transient movement of the hoisted object.

11. The apparatus according to claim 10, wherein to perform the noise reduction comprises to sample the IMU at a sample period that is greater than a sample period of the IMU.

12. A computer implemented method for transferring an angular momentum between a hoisted object and a flywheel, comprising:

with a computer processor and a computer memory and instructions for a stability application in the memory, processing the instructions for the stability application in the memory with the computer processor and thereby obtaining an angular acceleration or an angular velocity of an enclosure from an IMU, determining a difference between a setpoint and the angular acceleration or the angular velocity of the enclosure from the inertial measurement unit (IMU), processing the difference with a proportionate term, an integral term, and a derivative term of a proportional-integral-derivative (PID) motor controller, determining an output voltage to be sent to a motor according to the proportionate term, the integral term, and the derivative term of the PID motor controller, sending the output voltage to the motor, and thereby changing an acceleration of the flywheel and transferring angular momentum between the hoisted object and the flywheel to drive the hoisted object toward the setpoint.

13. The method according to claim 12, wherein the setpoint comprises one of a target angular rate of the enclosure or an orientation of the enclosure.

14. The method according to claim 12, wherein transferring the angular momentum between the hoisted object and the flywheel further comprises processing the instructions for the stability application in the memory with the computer processor and thereby determining a desired angular velocity of the flywheel, wherein the desired angular velocity of the flywheel is to transfer angular momentum between the hoisted object and the flywheel to drive the hoisted object toward the setpoint.

15. The method according to claim 14, wherein transferring the angular momentum between the hoisted object and the flywheel further comprises processing the instructions for the stability application in the memory with the computer processor and thereby obtaining a measurement corresponding to an angular momentum of the hoisted object and determining the desired angular velocity of the flywheel based on the measurement corresponding to the angular momentum of the hoisted object.

16. A computer apparatus to transfer an angular momentum between a hoisted object and a flywheel, comprising:

with a computer processor and a computer memory and instructions for a stability application in the memory;

means to process the instructions for the stability application in the memory with the computer processor, and means to thereby:

obtain an angular acceleration or an angular velocity of an enclosure from an inertial measurement unit (IMU), determine a difference between a setpoint and the angular acceleration or the angular velocity of the enclosure from the IMU, process the difference with a proportionate term, an integral term, and a derivative term of a proportional-integral-derivative (PID) motor controller, determine an output voltage to be sent to a motor according to the proportionate term, the integral term, and the derivative term of the PID motor controller, send the output voltage to the motor, and thereby change an acceleration of the flywheel and transfer angular momentum between the hoisted object and the flywheel to drive the hoisted object toward the setpoint.

17. The computer apparatus according to claim 16, wherein the setpoint comprises one of a target angular rate of the enclosure or an orientation of the enclosure.

18. The computer apparatus according to claim 16, wherein means to transfer the angular momentum between the hoisted object and the flywheel further comprises means to process the instructions for the stability application in the memory with the computer processor and means to thereby determine a desired angular velocity of the flywheel, wherein the desired angular velocity of the flywheel is to transfer angular momentum between the hoisted object and the flywheel to drive the hoisted object toward the setpoint.

19. The computer apparatus according to claim 18, wherein means to transfer the angular momentum between the hoisted object and the flywheel further comprises means to process the instructions for the stability application in the memory with the computer processor and means to thereby obtain a measurement corresponding to an angular momentum of the hoisted object and determine the desired angular velocity of the flywheel based on the measurement corresponding to the angular momentum of the hoisted object.

20. The computer apparatus according to claim 19, further comprising means to obtain the measurement corresponding to an angular momentum of the hoisted object from a load sensor.

* * * * *